E. J. MOLERA & J. C. CEBRIAN.
Regulator for Electric-Lights.
No. 214,515. Patented April 22, 1879.
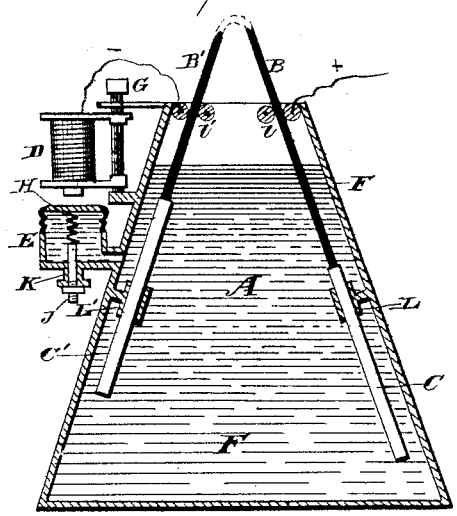
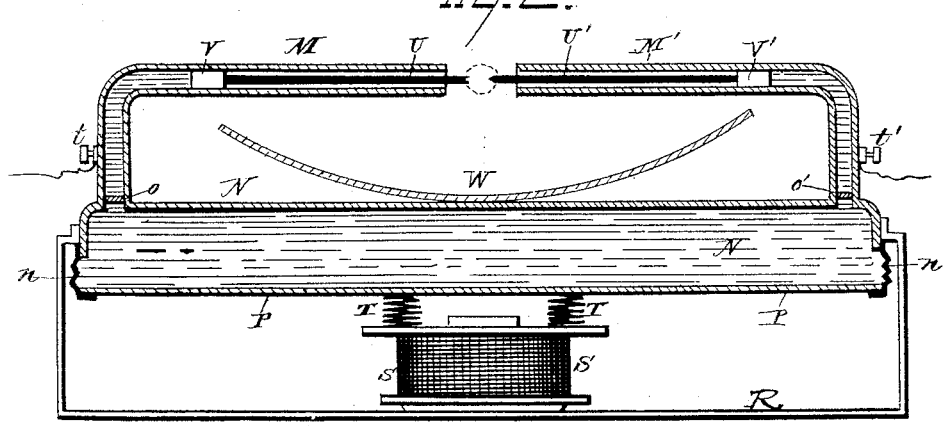

UNITED STATES PATENT OFFICE.

EUSEBIUS J. MOLERA AND JOHN C. CEBRIAN, OF SAN FRANCISCO, CAL.

IMPROVEMENT IN REGULATORS FOR ELECTRIC LIGHTS.

Specification forming part of Letters Patent No. 214,515, dated April 22, 1879; application filed December 27, 1878.

*To all whom it may concern:*

Be it known that we, EUSEBIUS J. MOLERA and JOHN C. CEBRIAN, of San Francisco, in the county of San Francisco and State of California, have invented certain new and useful Improvements in Electric-Light Regulators; and we do hereby declare the following to be a full, clear, and exact description of the invention, such as will enable others skilled in the art to which it pertains to make and use it, reference being had to the accompanying drawings, which form part of this specification.

Our invention relates to electric-light regulators, and is designed to provide a construction of the same which will be most efficient in maintaining the light constant, without variation in degree or brilliancy, while at the same time the parts and mechanism which constitute said regulator are simple and few.

The invention consists in the combination, with a chamber or chambers suitably filled with liquid, and in which the electrodes are supported in burning position, of a communicating chamber made wholly or partially elastic, and adapted, in connection with an electro-magnet, through which the electric current of the lamp passes, to vary in capacity as the strength of said current varies; second, in the combination, with a chamber or chambers suitably filled with liquid, and in which the electrodes are supported, of an elastic chamber communicating therewith and located with its top below the lowest level of liquid in said chamber or chambers, a part of said elastic chamber being formed of a magnetic substance, and adapted, in connection with an electro-magnet, through which the lamp-current passes, to expand and contract corresponding to the variance in the strength of said electric current; third, in the combination, with an elastic chamber which varies the level of the liquid, which latter supports the electrodes in burning position, of a spring device adapted to adjust the tension with which said chamber resists expansion when subjected to the attraction of an electro-magnet; fourth, in the combination, with an elastic chamber which varies the level of the liquid in which the electrodes are supported, of an electro-magnet actuated by the electric current of the lamp and an adjusting device, which latter is adapted to move said electro-magnet to or from the elastic chamber; fifth, in the combination, with a float regulator, which maintains the electrodes in burning position, of a magnet regulator which automatically lights the lamp in the first instance and relights it when afterward it may be put out, the same being adapted to vary the level of the liquid in said float regulator coincident with the variance in strength of the electric current, whereby the electrodes are relatively adjusted corresponding with the intensity of the electric current, and also whereby the intensity of said current is varied corresponding with the relative adjustment of the electrode; sixth, in the combination, with a chamber or chambers suitably filled with liquid, and in which the electrodes are held in burning position, of an expansible chamber communicating therewith, and provided with an elastic tension device, together with an electro-magnet through which the lamp-current passes, that portion of the expansible chamber nearest said magnet being formed of soft iron or other magnetic substance, the whole being adapted to cause the electrodes to separate as the electric current increases and to approach each other as said current decreases in strength.

Referring to the drawings, Figure 1 is a view, in vertical section, of one form of regulator illustrating our invention. Fig. 2 is a similar view of another form of regulator embodying the invention.

If we suppose everything arranged as represented in Fig. 1, and the level of A be constant, it is evident that whenever a portion of B or B' is burned or cut away the systems C B' or C' B', becoming lighter, will be pushed upward until the weight of the liquid displaced by the distance raised equals the weight lost by B or B'.

We propose to make the floats C C' such that the weight of the liquid A displaced by any length of said floats will be equal to the weight of an identical length of their corresponding electrodes, and consequently the upward motion of C and C' will be exactly equal to the lengths lost by B and B', thus keeping their upper ends constantly at the same height.

Therefore, if we once start the electric arc, having the upper ends of B and B' at the proper distance apart, the burning electrodes will be set in a continuous upward motion, keeping constantly their burning ends at the same height, and consequently at the same distance apart, even if they burn unequally and unevenly. The only cause tending to disturb such state of things is the variation of the level of A. This we keep controlled and properly regulated by the electric current passing through the electro-magnet D, which also serves the purposes of starting the light and regulating the flow of said current, as we are going to explain. The electro-magnet D is made stationary, one end of its wire communicating with the source of electricity, and the other one with one of the electrodes. Under D we place the closed elastic chamber E in communication with F, and full with the same liquid A. The top of E is of soft iron, and its sides or walls are totally or partially elastic, allowing said top to go up and down, therefore allowing the volume of E to vary. G is a stationary adjusting-screw, that will set the magnet D nearer to or farther from E, in order to adjust their distance, if necessary. H is a spring or set of springs attached to the top of E and the adjusting-screw J, which is set in a stationary piece, K, so that the spring H pulls the top of E away from D; and by means of the adjusting-screw J we may regulate the size or volume of E, and therefore the height of the level of A in vessel F. The screw J is set in such a way that when the lamp is not burning the level of A is high enough to allow the upper ends of B and B' to come in contact. Thus, when the lamp is properly connected to the source of electricity, the current will pass through B and B' and through D, which will set the magnet in activity; then it will attract the top of E, and, as D can partially overcome the opposite pulling-strength of H, E will expand, the level of A will get lower, the points of B and B' will be put apart, and the electric arc will spring between them, after which the lamp will keep burning, as said before.

The attractive strength of D will vary with the intensity of the electric current, and, as we see that the stronger said attraction the lower gets the level of A and the wider the distance between the points B and B', it is evident that the stronger the electric current is the wider apart the burning ends of B and B' will be, and vice versa. Therefore, if the position of G, the power of D, the position of J, and the strength of H are properly adjusted, it is clear that whenever the intensity of the current varies, the electrodes will assume, by reason of said current, a different position, so as to check said variation of intensity; and reversely, whenever the positions of the electrodes vary, the electric current passing through D will check said variation of position by action on the level of A.

One of the connecting-wires from the source of electricity to the lamp must go to an electrode, B, for instance; the other one to the magnet, thence to the other electrode. B' will be attached thereto in any of the ordinary ways already used. Thus we have an electric-light regulator or lamp which answers perfectly well all the purposes of such without fail, and avoid the use of any complicated and delicate machinery; but we wish to be clearly understood that our invention is not limited to the particular shape or disposition of the parts shown in Fig. 1.

The vessel F may be of any appropriate shape and material as long as it affords the necessary room for the floats and their electrodes. The liquid A may be any suitable liquid or any mixture of liquids. The electrodes B B' may be carbon pencils, wires, or of any other kind; they may be of any size or shape — cylindrical, prismoidal, a stick, a plate, &c. They may be placed more or less inclined, presenting to each other their narrower or broader sides, as deemed convenient. The floats C C' may also be of any convenient material, size, and shape, as long as their volume is in accordance with the rule above written relative to the densities of A and of the electrodes. They may be solid or made totally or partially hollow, and such that they may open and shut by means of screws, or otherwise, in order that we may vary their length or fill them with some weight, so as to have at the start a certain height, if desired. The connections of the electrodes with their floats may be any of the well-known means of fastening. The guides L L' l l' may also be of any appropriate size, shape, material, and inclination, as long as they allow a free upward and downward motion of the electrodes and their floats and afford them the necessary steadiness. They may be connected to each other or not. In Fig. 1 we show them of two kinds; as instances, one is a collar, the other is composed of two little rollers. In Fig. 2, as we will see, they are the tubes M M'. The additional elastic chamber E may be of any shape and convenient size, placed close to or separated from F, as long as it is below the lowest level of A. The connection between F and E may be had through any tube or channel whatever. The top of E or any other part of its surface must be of soft iron or of any material attracted by a magnet. The rest of the surface of E must be wholly or partially elastic. The electro-magnet D may be of any construction. It must be so disposed as to act upon the top or upon any portion of E, so as to increase its volume. It must be wholly stationary in relation to F, or must have only a very small play, controlled by an adjusting-screw, G, which must be fast to F, or made stationary any other way. The spring or springs H may be of any description whatever. They may go through E or outside of it, as long as their pulling-strength be in the opposite direction to the attraction of D. The piece K, supporting the adjusting-screw J, must be stationary. In fine, the set of pieces G D E H K J, constituting the electric regulator, may be taken far away from F, as we said relative to E. We may even dispense with E and incorporate it within F. For that purpose we must have a portion of the surface of F elastic, so as to allow its bottom or any other part of the surface of F to have reciprocatory motion, which will cause the level of A to go up and down. Then we have only to place in connection with said movable portion an electro-magnet, an opposing spring, and their adjusting-screws, substantially equal to and working like the above-said pieces D H J G of Fig. 1.

In order to better understand this explanation, we show in Fig. 2 another of the many ways to dispose the different parts of our device within the scope of our invention. N is the vessel containing the liquid. $n$ is an elastic ring connecting the upper part of N to the plate P, which is made partly or wholly of soft iron. R is a handle to carry or hold the whole apparatus. S is the electro-magnet to attract the plate P. T are a set of springs pushing P away from S. The magnet and the springs are provided with proper adjusting-screws, similar to J and G of Fig. 1, but not represented in Fig. 2 to avoid complication. U U' are the two electrodes attached to the floats V V', and all guided by the tubes M M'. If we suppose the plate P horizontal, or nearly so, and the tubes M M' inclined, this apparatus will operate exactly like that of Fig. 1; but this Fig. 2 shows, besides, how to dispose everything when the electrodes must be used horizontally, which is not so readily understood by Fig. 1. We have only to enlarge C C' of Fig. 1 enough to be the two pistons V V', fitting easily within M M', only preventing the liquid from escaping. I and T are made so as to allow the points of U U' to be in contact when the lamp is not burning. When the electric current passes through the lamp the magnet S attracts P, the volume of N increases, the distance between U and U' also increases, the electric arc is formed, S continues attracting P, the distance between U and U' increases still more, until the current is broken, at which time the light is extinguished, the magnet loses its activity, the springs T push P away from S, the points U U' come in contact again, and therefore the current is re-established, and the same operations recommence.

Thus we obtain a series of flashes, which, if they come oftener than twenty-five times in a second, will constitute a perfect light. $w$ shows a reflector of any suitable kind, that may be attached to N, if desired. It is clearly seen that this lamp, Fig. 2, will work in any position as long as the electrodes U U' are horizontal, or nearly so, whether R is above, on a side, or below U U'. Therefore it is well adapted to be hung from the ceiling or from a wall when in use.

It will be observed that the device of Fig. 2 is not different in essential principle from that of Fig. 1, although their operation may seem somewhat different. Our regulator (shown in Fig. 1) consists of two main parts—the floating regulator and the magnet-regulator. The first one keeps the floats at a proper distance within certain limits; the second one controls those limits by controlling the level of A, and also serves to start the light at the beginning and whenever it goes out, so that Fig. 1 without the part D E H would not be complete.

The disposition of the parts in Fig. 2 when M M' are not horizontal is equal to Fig. 1; but in the particular case of U U' being horizontal Fig. 2 is composed of the same parts, with the only difference that the float-pistons in this case are not constructed according to the rule laid down for the floats of Fig. 1. As for the difference in their operations, we see that in Fig. 1 the magnet starts the light, after which it burns some appreciable time; whereas in Fig. 2 as soon as soon as the magnet starts the light it becomes extinguished, so that the magnet has to start it again and again continuously. We might even say that this particular device shown in Fig. 2 is the same apparatus as the essential parts shown in Fig. 1, deprived only of the buoying force of A.

It will further be observed that in instance of the guides $l$ $l'$ L L' being so disposed that the electrodes are always kept in a parallel position, then the magnet-regulator D E H of Fig. 1 will have no practical use, and we will need a means of starting the light, which may be accomplished by a very thin piece of electrode placed on top of B and B', so as to bring their ends nearer. This piece will be quickly burned away; or else there may be used electric lighters, such as are employed in gas-burners. If in that case a portion of vessel F is elastic, or F is connected to an additional elastic chamber, we may press the elastic part by a set-screw or other means, and therefore we will raise or lower the focus of light at pleasure. This method of supporting the electrodes may also be applied to the case of having a single candle, as a Jablochkoff's, for instance, whether it is held vertical or inclined. These candles, in fact, do not need a regulator, only when the burning focus must be constantly kept at the same height, which latter result our device will well accomplish.

The different parts of our regulators may all be made of good conductors or bad conductors of electricity; but care should be taken to have the two electrodes properly isolated from each other, so that the current cannot pass except between their free ends. For instance, in Fig. 1 we suppose the current to enter through the guides $l$ $l'$, which we suppose perfectly isolated, the liquid being a bad conductor.

In Fig. 2 we suppose the liquid in M and M' and the pistons V V' to be good conductors, and the tubes themselves bad conductors. Then we insert at $o$ $o'$ two bad conductors and let the current enter at $t$ $t'$. However, any skillful electrician will readily understand how to isolate said electrodes.

Having fully described our invention, what we claim as new, and desire to secure by Letters Patent, is—

1. In an electric-light regulator, the combination, with a chamber or chambers suitably filled with liquid, and in which the electrodes are supported in burning position, of a communicating chamber made wholly or partially elastic, and adapted, in connection with an electro-magnet through which the electric current of the lamp passes, to vary in capacity as the strength of said current varies, substantially as set forth.

2. In an electric-light regulator, the combination, with a chamber or chambers suitably filled with liquid, and in which the electrodes are supported, of an elastic chamber communicating therewith, and located with its top below the lowest level of liquid in said chamber or chambers, a part of said elastic chamber being formed of a magnetic substance and adapted, in connection with an electro-magnet through which the lamp-current passes, to expand and contract corresponding to the variance in the strength of said electric current, substantially as set forth.

3. In an electric-light regulator constructed according to the principle herein described, the combination, with the elastic chamber, of a spring device adapted to vary the tension with which the same resists expansion when subjected to the attraction of the electro-magnet, substantially as set forth.

4. In an electric-light regulator constructed according to the principle herein described, the combination, with the elastic chamber, of an electro-magnet and an adjusting device adapted to move the latter to and from said chamber, substantially as set forth.

5. The combination, with a float-regulator which maintains the electrodes in burning position, of a magnet-regulator which automatically lights the lamp in the first instance and relights it when afterward it may be put out, the same being adapted to vary the level of the liquid in said float-regulator coincident with the variance in strength of the electric current, whereby the electrodes are relatively adjusted corresponding with the intensity of the electric current, and also whereby the intensity of said current is varied corresponding with the relative adjustment of the electrodes, substantially as set forth.

6. An electric-light regulator consisting in the combination, with a chamber or chambers suitably filled with liquid, and in which the electrodes are held in burning position, of an expansible chamber communicating therewith and provided with an elastic tension device, together with an electro-magnet through which the lamp-current passes, that portion of the expansible chamber nearest said magnet being formed of soft iron or other magnetic substance, the whole being adapted to cause the electrodes to separate as the electric current increases and to approach each other as said current decreases in strength, substantially as set forth.

In testimony that we claim the foregoing we have hereunto set our hands this 9th day of December, 1878.

EUSEBIUS J. MOLERA.
JOHN C. CEBRIAN.

Witnesses:
F. O. WEGENER,
THOMAS D. GRAHAM.